United States Patent [19]
Sutton

[11] 3,865,947
[45] Feb. 11, 1975

[54] α,β-UNSATURATED ESTERS OF VULPINIC ACID
[75] Inventor: Blaine M. Sutton, Hatboro, Pa.
[73] Assignee: Smithkline Corporation, Philadelphia, Pa.
[22] Filed: May 7, 1973
[21] Appl. No.: 357,982

Related U.S. Application Data
[60] Division of Ser. No. 276,020, July 28, 1972, Pat. No. 3,749,740, which is a continuation-in-part of Ser. No. 150,209, June 4, 1971, abandoned.

[52] U.S. Cl. .................................................. 424/285
[51] Int. Cl. ........................................... A61k 27/00
[58] Field of Search .................................... 424/285

Primary Examiner—Stanley J. Friedman
Attorney, Agent, or Firm—Joseph A. Marlino; Richard D. Foggio; William H. Edgerton

[57] ABSTRACT

α, β-Unsaturated esters of vulpinic acid having antiarthritic activity prepared by the acylation of the corresponding vulpinic acid with an active derivative of the appropriate carboxylic acid such as an acyl halide.

2 Claims, No Drawings

α,β-UNSATURATED ESTERS OF VULPINIC ACID

This is a division of application Ser. No. 276,020 filed July 28, 1972 now U.S. Pat. No. 3,749,740, which is a continuation-in-part of Ser. No. 150,209, filed June 4, 1971, now abandoned.

This invention relates to novel ester derivatives of vulpinic acid having valuable pharmacodynamic activity. More specifically these compounds possess anti-arthritic activity and at anti-arthritic doses they further produce analgesic and antipyretic activity.

The compounds of this invention are represented by the following general structural formula:

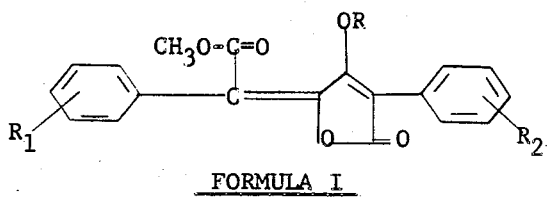

FORMULA I wherein:

R represents acrylyl, methacrylyl, dimethylacrylyl, crotonyl or cinnamoyl; and $R_1$ and $R_2$ each represent hydrogen, chlorine, bromine, fluorine, lower alkyl of from one to four carbon atoms, lower alkoxy of from one to four carbon atoms, dimethoxy, trimethoxy, or trifluoromethyl.

Preferably the compositions of this invention comprise a compound of Formula I above when R is acrylyl and $R_1$ and $R_2$ are each hydrogen, chlorine, fluorine, methyl, methoxy or ethoxy. Most advantageously R is acrylyl, $R_1$ is hydrogen or ethoxy, and $R_2$ is hydrogen, chlorine, fluorine, methyl, methoxy or ethoxy.

The novel substituted ester derivatives of vulpinic acid are prepared according to the following synthetic procedure:

in which R, $R_1$ and $R_2$ are as defined above for Formula I. Thus a phenylacetonitrile is condensed with ethyl oxalate in an alcoholic solution of an alkali metal lower alkoxide, such as sodium methoxide or ethoxide to give the ethyl 3-cyano-3-phenylpyruvate. This compound is further condensed with a phenylacetonitrile in an alcoholic solution of an alkali metal lower alkoxide, such as sodium methoxide or ethoxide to yield the 2,5-diphenyl-3,4-dioxoadiponitrile. The above condensations may also be carried out using a metal hydride, such as sodium hydride, in diglyme. The adiponitrile derivative is refluxed for a short period of time, for example one or two hours, in an aqueous acid solution such as water/glacial acetic acid/concentrated sulfuric acid mixture and the resulting pulvinic acid is refluxed with acetic anhydride to furnish the corresponding pulvinic acid lactone of Formula II above. The dilactone is ring opened to the vulpinic acid derivative by brief refluxing with methanol containing a mineral acid such as hydrochloric acid. The vulpinic acid derivative is then heated with the appropriate acyl halide, preferably acyl chloride. The reaction is advantageously carried out in a nonreactive organic solvent such as chloroform in the presence of pyridine to yield the desired ester of vulpinic acid.

When $R_1$ and $R_2$ are different in the above synthetic sequence, the ring opening of the dilactone of Formula II gives a mixture of positional isomers, namely compounds of Formula I and compounds of the following formula:

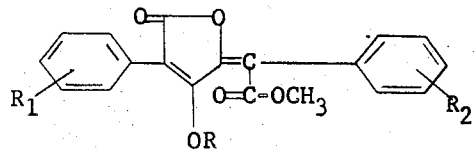

FORMULA III

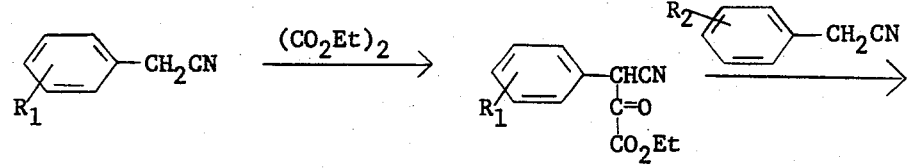

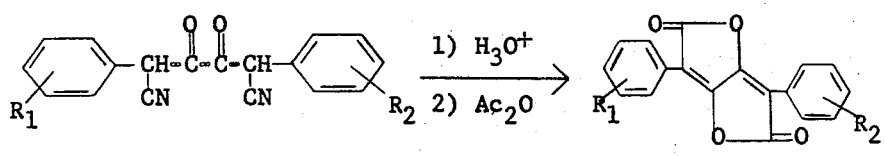

FORMULA II

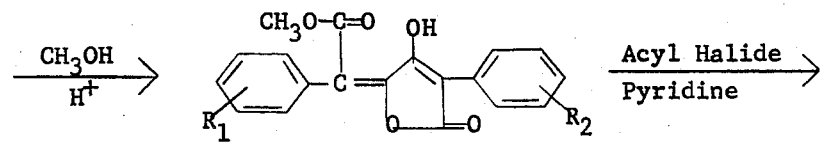

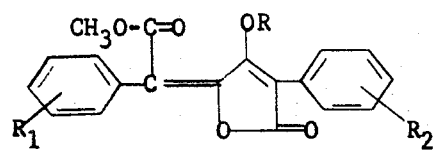

The ratio of isomers obtained is variable and depends on the nature of $R_1$ and $R_2$. The isomers can be separated by fractional crystallization and/or chromatographic procedures. Their identity is determined from the nuclear magnetic resonance patterns of the aromatic protons. This identification can be confirmed by degradative ozonolysis.

The anti-arthritic activity of the compounds of this invention is measured by their ability to inhibit adjuvant arthritis in rats. The novel compounds of this invention produce marked inhibition of the development of adjuvant arthritis in rats at a daily oral dose of 25 mg. per kilogram of body weight. Adjuvant arthritis in rats is produced by a single injection of 0.75 mg. of Mycobacterium butyricum suspended in white paraffin (N.F.) into a hindpaw (left footpad). The injected paw becomes inflamed and reaches a maximum volume in 3–5 days (primary lesion). The animals exhibit a decrease in body weight gain during this initial period. Adjuvant arthritis (secondary phase) occurs after a delay of approximately 10 days and is characterized by inflammation of the non-injected sites (right hind leg), decrease in body weight gain and further increases in the volume of the injected hind leg. The compounds of Formula I administered in the doses described above beginning on the day of adjuvant injection and continuing for 17 days thereafter, exclusive of days 4, 5, 11 and 12, protect the animals against development of both primary and secondary lesions of adjuvant arthritis.

The compounds of this invention may be administered orally or parenterally in conventional dosage unit forms such as tablets, capsules, injectables or the like, by incorporating the appropriate dose of a compound of Formula I, with carriers according to accepted pharmaceutical practices. Preferably the compound is administered orally to an animal organism in a tablet or capsule comprising an amount sufficient to produce anti-arthritic activity. Each dosage unit will contain the active medicament in an amount of about 10 mg. to about 50 mg. Advantageously equal doses will be administered 1 to 3 times daily with the daily dosage regimen being about 10 mg. to about 150 mg.

The pharmaceutical carrier employed may be, for example, either a solid or liquid. Exemplary of solid carriers are lactose, terra albe, sucrose, talc, gelatin, agar, pectin, acacia, magnesium stearate, stearic acid and the like. Exemplary of liquid carriers are syrup, peanut oil, olive oil, water and the like. Similarly the carrier or diluent can include any time delay material well known to the art, such as glyceryl monostearate or glyceryl distearate alone or with a wax.

A wide variety of pharmaceutical forms can be employed. Thus, if a solid carrier is used the preparation can be tableted, placed in a hard gelatin capsule in powder or pellet form, or in the form of a troche or lozenge. The amount of solid carrier will vary widely but preferably will be about 25 mg. to about 1 g. If a liquid carrier is used, the preparation will be in the form of a syrup, emulsion, soft gelatin capsule, sterile injectable liquid such as an ampule, or an aqueous or nonaqueous liquid suspension.

The following examples are not limiting but are illustrative of compounds of this invention and the procedures for their preparation. Other variations of this invention will be obvious to those skilled in the art.

EXAMPLE I

A mixture of 117.1 g. (1.0 m.) of phenylacetonitrile and 326 ml. (2.4 m.) of ethyl oxalate is added to an ethanol solution of sodium ethoxide (prepared by dissolving 23.8 g., 1.08 g. atom of sodium in 500 ml. of absolute ethanol) and refluxed two hours. After cooling, diluting with 2,500 ml. of water and extracting with ether, the solution is acidified with acetic acid. The solid is removed and washed with water to give ethyl 3-cyano-3-phenylpyruvate, m.p. 127°–129° C.

Ethyl 3-cyano-3-phenylpyruvate (50.0 g., 0.23 m.) and 41.0 g. (0.35 m.) of phenylacetonitrile are added to an alcoholic solution of sodium ethylate (prepared from 13.4 g. [0.58 g. atom] of sodium and 360 ml. of absolute ethanol) and the resulting yellow solution is refluxed for one and threequarter hours. The cooled solution is diluted with 700 ml. of water and acidified by slow addition of acetic acid. After further cooling in ice, the suspension is filtered and the removed solid washed with water and dried to give 2,5-diphenyl-3,4-dioxoadiponitrile, m.p. 284°–286° C. (d.).

A mixture of 30.0 g. (0.104 m.) of 2,5-diphenyl-3,4-dioxoadiponitrile in 260 ml. of water, 380 ml. of glacial acetic acid and 190 ml. of concentrated sulfuric acid is refluxed for 1 hour. The suspension is cooled, poured onto 900 ml. of ice water and the solid removed and washed to give pulvinic acid, m.p. 215°–216.5° C.

Pulvinic acid (19.0 g., 0.0616 m.) is refluxed in 250 ml. of acetic anhydride for 15 minutes. The cooled solution is stirred into 1,200 ml. of ice and water and the oily mass crystallized by stirring in 500 ml. of ethanol. The yellow solid is removed, washed with ethanol and dried to yield pulvinic acid lactone, m.p. 221.5°–223° C.

A mixture of 3.5 g. (0.012 m.) of pulvinic acid lactone in 250 ml. of methanol containing 5 ml. of hydrochloric acid (36%) is refluxed 15 minutes forming a yellow solution. The reaction mixture is concentrated to 50 ml. under reduced pressure, cooled and the crystallized solid, vulpinic acid, is washed and dried, m.p. 148°–149.5° C.

Acrylyl chloride, 5 ml., is added to a solution of 3.2 g. (.01 m.) vulpinic acid in 25 ml. of chloroform containing 1 ml. of pyridine and refluxed for five minutes. The reaction mixture is then concentrated, washed and recrystallized to yield acrylylvulpinic acid having a melting point of 143.5°–145° C.

EXAMPLE 2

Methacrylyl chloride, 10 ml., is added to a solution of 6.4 g. of vulpinic acid (as prepared in Example 1) in 50 ml. of chloroform containing 4 ml. of pyridine and refluxed for 5 minutes. The reaction mixture is then concentrated, washed and recrystallized to yield methacrylylvulpinic acid having a melting point of 168.5°–170° C.

EXAMPLE 3

Dimethylacrylyl chloride, 5 ml., is distilled from 7.5 g. of dimethylacrylic acid and 21.1 g. of benzoyl chloride and added to a solution of 3.2 g. of vulpinic acid (as prepared in Example 1) in 25 ml. of chloroform containing 2 ml. of pyridine. The reaction mixture is then concentrated, washed and recrystallized to yield dimethylacrylylvulpinic acid.

EXAMPLE 4

A solution of 15 ml. crotonyl chloride, 9.2 g. of vulpinic acid, 6 ml. of pyridine and 75 ml. of chloroform is refluxed for 10 minutes. The reaction mixture is then concentrated, washed and recrystallized to yield crotonylvulpinic acid.

EXAMPLE 5

A mixture of 45.3 g. (0.31 m.) of p-chlorophenylacetonitrile and 107 g. (0.72 m., 99 ml.) of diethyl oxalate in an alcoholic sodium ethylate solution (prepared by dissolving 7.13 g. [0.31 g. atom] of sodium in 120 ml. of absolute ethanol) is refluxed with stirring for 2 hours. The cooled reaction mixture is diluted with 700 ml. of water, acidified with acetic acid and cooled to ice bath temperature. The resulting solid is recrystallized from aqueous methanol to give ethyl 3-cyano-3-(p-chlorophenyl)-pyruvate, m.p. 134°–135° C.

Ethyl 3-(p-chlorophenyl)-3-cyanopyruvate (40 g., 0.16 m.) and p-chlorophenylacetonitrile (49.8 g., 0.33 m.) are added to an alcoholic solution of sodium ethylate (prepared from 7.36 g., [0.32 g. atom] of sodium and 190 ml. of absolute ethanol) and the resulting solution is refluxed for 2 hours. The reaction mixture is diluted with water, acidified with acetic acid and cooled to ice bath temperature to yield 2,5-di-(-p-chlorophenyl)-3,4-dioxoadiponitrile, m.p. 280° C.

A solution of 15 g. (0.042 m.) of 2,5-di-(p-chlorophenyl)-3,4-dioxoadiponitrile in a mixture of 150 ml. of water, 210 ml. of acetic acid and 105 ml. of concentrated sulfuric acid is stirred and refluxed for 2 hours. The reaction mixture is diluted with 500 ml. of water and cooled to ice bath temperature to yield 4,4'-dichloropulvinic acid, m.p. 255° C. The acid is refluxed in acetic anhydride to obtain the corresponding 4,4'-dichloropulvinic acid lactone.

A mixture of 5.6 g. (0.0156 m.) of 4,4'-dichloropulvinic acid lactone in 250 ml. of methanol containing 5 ml. of hydrochloric acid is refluxed for 15 minutes. The reaction mixture is concentrated to 50 ml. under reduced pressure, cooled and the crystallized solid removed, washed and dried to give 4,4'-dichlorovulpinic acid, m.p. 175°–177° C.

A solution of 10 ml. of acrylyl chloride, 8.0 g. of 4,4'-dichlorovulpinic acid, 5 ml. of pyridine and 50 ml. of chloroform is refluxed for 10 minutes. The reaction mixture is then concentrated, washed and recrystallized to yield acrylyl 4,4'-dichlorovulpinic acid.

EXAMPLE 6

Similarly by employing m-chlorophenylacetonitrile in the initial reaction described in Example 5 to obtain ethyl 3-cyano-3-(m-chlorophenyl)-pyruvate followed by reaction with m-chlorophenylacetonitrile and the subsequent synthetic steps, there is prepared the isomeric product acrylyl 3,3'-dichlorovulpinic acid.

EXAMPLE 7

Following the procedures outlined in Examples 1 and 5, p-methoxyphenylacetonitrile is reacted with diethyl oxalate in alcoholic sodium ethoxide solution to give ethyl 3-cyano-3-(p-methoxyphenyl)-pyruvate which is then similarly reacted with phenylacetonitrile to yield 2-(p-methoxyphenyl)-5-phenyl-3,4-dioxoadiponitrile, m.p. 256°–258° C.

A solution of the adiponitrile in water, acetic acid and concentrated sulfuric acid is refluxed for two hours and the resulting crude mixture of 4- and 4'-methoxypulvinic acid is refluxed in acetic anhydride to give 4-methoxypulvinic acid lactone, m.p. 204°–208° C.

A mixture of 4.0 g. of 4-methoxypolvinic acid lactone and 500 ml. of methanol containing 6 ml. of hydrochloric acid (36%) is refluxed until a clear solution forms. The solution is evaporated to dryness and the solid is boiled in acetone and cooled to give 4'-methoxyvulpinic acid, m.p. 200°–202° C.

The acetone filtrate is evaporated to a dark oil which is stirred in ice-cold acetone until a thick solid forms. This is filtered to yield 4-methoxyvulpinic acid, m.p. 117°–119°C.

Acrylyl chloride, 5 ml., is added to a solution of 4.5 g. of 4'-methoxyvulpinic acid in 25 ml. of chloroform containing 2 ml. of pyridine and refluxed for 5 minutes. The reaction mixture is concentrated, washed and recrystallized to yield acrylyl 4'-methoxyvulpinic acid.

EXAMPLE 8

Following the procedures outlined in Examples 1 and 5, p-methylphenylacetonitrile and diethyl oxalate are reacted in alcoholic sodium ethoxide to obtain ethyl 3-cyano-3-(p-methylphenyl)-pyruvate, m.p. 86°–88° C. The latter is reacted with p-methylphenylacetonitrile to give 2,5-di-(p-methylphenyl)-3,4-dioxoadiponitrile, m.p. 270°–272° C.

The adiponitrile is refluxed with water, acetic acid and concentrated sulfuric acid to give 4,4'-dimethylpulvinic acid, m.p. 246°–250° C., which is refluxed in turn with acetic anhydride to yield 4,4'-dimethylpulvinic acid lactone. The lactone is ring opened with methanol and hydrochloric acid to the product 4,4'-dimethylvulpinic acid, m.p. 187°–189° C.

Similarly by employing acrylyl chloride as described above there is obtained as the final product acrylyl 4,4'-dimethylvulpinic acid.

EXAMPLE 9

By employing the procedures set forth in Examples 1 and 5, p-fluorophenylacetonitrile is reacted with diethyl oxalate in alcoholic sodium ethoxide to give ethyl 3-cyano-3-(p-fluorophenyl)-pyruvate. Reaction of the latter under similar conditions with p-fluorophenylacetonitrile results in 2,5-di-(p-fluorophenyl)-3,4-dioxoadiponitrile.

The adiponitrile is refluxed in water, acetic acid and concentrated sulfuric acid to yield 4,4'-difluoropulvinic acid which is treated with acetic anhydride to obtain 4,4'-difluoropulvinic acid lactone. The lactone ring is opened with methanol and hydrochloric acid to give 4,4'-difluorovulpinic acid, m.p. 151° C.

Crotonyl chloride, 15 ml., is added to a solution of 12.0 g. of 4,4'-difluorovulpinic acid in 80 ml. of chloroform containing 4 ml. of pyridine and refluxed. The reaction mixture is then concentrated, washed and recrystallized to yield crotonyl 4,4'-difluorovulpinic acid.

Similarly, by utilizing m-trifluoromethylphenylacetonitrile as the initial reactant as described above there is ultimately produced crotonyl 3,3'-bistrifluoromethylvulpinic acid.

EXAMPLE 10

As described in Example 1, ethyl 3-cyano-3-phenylpyruvate is reacted with 3,4,5-trimethoxyphenylacetonitrile in an alcoholic solution of sodium ethoxide to give 2-(3',4',5'-trimethoxyphenyl)-5-phenyl-3,4-dioxoadiponitrile. The latter is refluxed in a mixture of water, glacial acetic acid and concentrated sulfuric acid to give a mixture of 3,4,5- and 3',4',5'-trimethoxypulvinic acid which is then refluxed in acetic anhydride to result in the formation of 3,4,5-trimethoxypulvinic acid lactone.

A mixture of 8.7 g. of 3,4,5-trimethoxypulvinic acid lactone and 700 ml. of methanol containing 12 ml. of hydrochloric acid (36%) is refluxed for 2 hours to form a clear solution, and then cooled to precipitate methyl 3,4,5-trimethoxypulvinate, m.p. 209°–211° C.

The filtrate is evaporated to dryness and the residue is dissolved in 500 ml. of hot methanol, cooled, and the solid which precipitates is filtered (a mixture of both isomers). The filtrate is allowed to sit for one-half hour and the yellow solid which forms is collected to give 3',4',5'-trimethoxyvulpinic acid, m.p. 170°–172° C.

A solution containing 10 ml. of methacrylyl chloride. 8.2 g. of 3',4',5'-trimethoxyvulpinic acid, 3 ml. of pyridine and 60 ml. of chloroform is refluxed for 5 minutes. The reaction mixture is concentrated, washed and recrystallized to yield methacrylyl 3',4',5'-trimethoxyvulpinic acid.

EXAMPLE 11

By following the procedures outlined in Examples 1 and 5, p-methoxyphenylacetonitrile is reacted with diethyl oxalate in alcoholic sodium ethoxide solution to give ethyl 3-cyano-3-(p-methoxyphenyl)-pyruvate. This compound is similarly reacted with p-methoxyphenylacetonitrile which results in the formation of 2,5-di-(p-methoxyphenyl)-3,4-dioxoadiponitrile. The latter is refluxed with water, acetic acid and sulfuric acid to obtain 4,4'-dimethoxypulvinic acid, which is treated with acetic anhydride to give the corresponding acid lactone.

4,4'-dimethoxypulvinic acid lactone (5.0 g.) is dissolved in 2% absolute methanolic potassium hydroxide (700 ml.) and set aside for 30 minutes at room temperature, then diluted with 700 ml. of water and acidified with hydrochloric acid. The yellow solid that separates is treated with aqueous sodium hydrogen carbonate and filtered again. The filtrate is acidified and the solid removed, washed and dried to give 4,4'-dimethoxyvulpinic acid, m.p. 177°–178° C.

Similarly, by reacting 4,4'-dimethoxyvulpinic acid with acrylyl chloride as described above there is obtained as the final product acrylyl 4,4'-dimethoxyvulpinic acid.

EXAMPLE 12

| Ingredients | Mg./Tablet |
| --- | --- |
| Acrylylvulpinic Acid | 10 |
| Calcium sulfate, dihydrate | 150 |
| Sucrose | 25 |
| Starch | 15 |
| Talc | 5 |
| Stearic Acid | 3 |

The sucrose, calcium sulfate and acrylylvulpinic acid are thoroughly mixed and granulated with hot 10% gelatin solution. The wetted mass is passed through a number 6 mesh screen directly onto drying trays. The granules are dried at 120° C. and passed through a number 20 mesh screen, mixed with the starch, talc and stearic acid, and compressed into tablets.

EXAMPLE 13

| Ingredients | Mg./Capsule |
| --- | --- |
| Methacrylylvulpinic Acid | 50 |
| Magnesium stearate | 5 |
| Lactose | 350 |

The above ingredients are screened through a number 40 mesh screen, mixed and filled into number 0 hard gelatin capsules.

EXAMPLE 14

As described in Example 1, ethyl 3-cyano-3-phenylpyruvate is reacted with p-chlorophenylacetonitrile in an alcoholic solution of sodium ethoxide to give 2-(4-chlorophenyl)-5-phenyl-3,4-dioxoadiponitrile. The latter is refluxed in a mixture of water, glacial acetic acid and concentrated sulfuric acid to give a mixture of 4 and 4'-chloropulvinic acid which is then refluxed in acetic anhydride to give 4-chloropulvinic acid lactone.

The mixture is separated by fractional crystallization as in Example 7 to yield pure 4-chlorovulpinic acid and 4'-chlorovulpinic acid.

Methacrylyl chloride, 10 ml., is added to a solution of 7.0 g. of 4-chlorovulpinic acid in 50 ml. of chloroform containing 3 ml. of pyridine and refluxed for 5 minutes. The reaction mixture is concentrated, washed and recrystallized to yield methacrylyl 4-chlorovulpinic acid.

EXAMPLE 15

A solution containing 16.6 g. of cinnamoyl chloride, 3.2 g. of vulpinic acid (as prepared in Example 1) and 25 ml. of chloroform containing 1 ml. of pyridine is refluxed for 5 minutes. The reaction mixture is concentrated, washed and recrystallized to yield cinnamoylvulpinic acid.

EXAMPLE 16

By following the procedures outline in Example 7 and employing p-ethoxyphenylacetonitrile in the initial reaction to obtain ethyl 3-cyano-3-(p-ethoxyphenyl)-pyruvate followed by reaction with phenylacetonitrile and the subsequent synthetic steps, there is prepared acryl 4-ethoxyvulpinic acid.

What is claimed is:

1. A pharmaceutical composition having antiarthritic activity in dosage unit form comprising a pharmaceutical carrier and from about 10 mg. to about 50 mg. of a chemical compound of the formula:

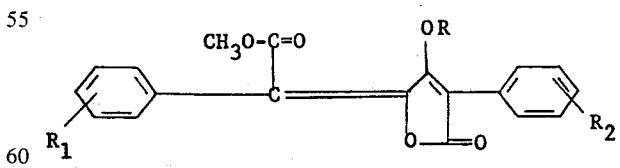

wherein:
R is acrylyl, methacrylyl, dimethylacrylyl, crotonyl or cinnamoyl; and
$R_1$ and $R_2$ are each hydrogen, chlorine, bromine, fluorine, lower alkyl of from one to four carbon atoms, lower alkoxy of from one to four carbon atoms, dimethoxy, trimethoxy, or trifluoromethyl.

2. The method of producing anti-arthritic activity which comprises administering internally to animals in need of arthritic relief an amount sufficient to produce said activity a chemical compound of the formula:

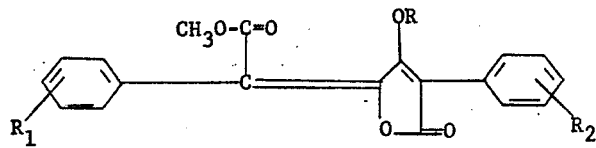

wherein:
R is acrylyl, methacrylyl, dimethylacrylyl, crotonyl or cinnamoyl; and
$R_1$ and $R_2$ are each hydrogen, chlorine, bromine, fluorine, lower alkyl of from one to four carbon atoms, lower alkoxy of from one to four carbon atoms, dimethoxy, trimethoxy, or trifluoromethyl.

* * * * *